United States Patent [19]

Holt

[11] Patent Number: 5,417,788

[45] Date of Patent: May 23, 1995

[54] METHOD AND INSTALLATION FOR PRODUCING A PANEL

[75] Inventor: Anthony C. Holt, Ullesthrope, Great Britain

[73] Assignee: Honicel Nederland B.V., Netherlands

[21] Appl. No.: 210,914

[22] Filed: Mar. 21, 1994

[51] Int. Cl.⁶ .......................... B31F 1/07; B32B 31/00
[52] U.S. Cl. .................................. 156/196; 156/291; 156/292
[58] Field of Search ............... 156/196, 214, 228, 290, 156/300, 291, 292; 52/314, 316, 806, 808, 309.9, 309.11; 428/116, 118, 68, 73, 74, 75, 77, 314.2; 181/288, 290, 292

[56] References Cited

U.S. PATENT DOCUMENTS

| | | | |
|---|---|---|---|
| 2,720,948 | 10/1955 | Pajak | 52/806 |
| 2,793,718 | 5/1957 | Pajak . | |
| 2,893,076 | 7/1959 | Herts | 52/806 |
| 3,959,056 | 5/1976 | Caplan | 156/214 |
| 4,265,067 | 5/1981 | Palmer . | |
| 4,416,716 | 11/1983 | Ichikawa et al. | 156/196 |
| 4,539,241 | 9/1995 | Kainulainen et al. . | |
| 4,643,787 | 2/1987 | Goodman | 156/228 |

FOREIGN PATENT DOCUMENTS 2123926 9/1972 France .
2101930 1/1983 United Kingdom .

*Primary Examiner*—Michael W. Ball
*Assistant Examiner*—Richard Crispino
*Attorney, Agent, or Firm*—Head & Johnson

[57] ABSTRACT

A method for producing a panel, for example a door panel, which comprises two sheets, at least one of which is provided with a relief, between which sheets a core of strips running transversely to said sheets is located, said method comprising the gluing of each sheet to the strip edges opposite, the core being compressed in order to pre-form depressions in which the relief of the sheet opposite can be accommodated and said sheet then being glued, at least to those parts of the core not provided with depressions.

4 Claims, 3 Drawing Sheets

METHOD AND INSTALLATION FOR PRODUCING A PANEL

The invention relates to a method for producing a panel, for example a door panel, which comprises two sheets, at least one of which is provided with a relief, between which sheets a core of strips running transversely to said sheets is located.

BACKGROUND OF THE INVENTION

A method of this type is known and comprises gluing each sheet to the strip edges opposite. The sheets provided with a relief or the edges of the strip material are provided with glue, after which the assembly comprising said sheets with the strip material between them is compressed. During this operation the relief in the sheets forms corresponding depressions in the strip material.

This known method has a number of disadvantages. Firstly, in practice it is not found to be simple to hold the sheets in the correct position with respect to the strip material during compression of the assembly. Initially only the highest parts of the relief of the sheets rests against the strip material, which leads to the sheets and the strip material shifting relative to one another parallel to their surfaces during the subsequent compression of the assembly. As a consequence the assembly acquires an uneven peripheral edge, one sheet protruding outwards further than the other.

For this reason it is necessary to use separate clamping elements which hold the various components of the assembly in the correct position with respect to one another during compression. The installation required for carrying out a method of this type is consequently relatively complex and expensive.

A further disadvantage of said known method is that the strip material of the core springs back to some extent. The consequence of this is that the thickness of the panel, comprising a core with sheets, having a relief, on either side, is greater before compression and the thickness finally obtained after gluing is smaller. This is highly undesirable in the case of the so-called cold-stack method, where a few tens of panels are stacked on top of one another. A stack of this type would result in too large a spring travel, with the consequence that the stack becomes unmanageable.

The aim of the invention is, therefore, to provide a method with which accurate production of such panels is nevertheless possible in a simple manner. This aim is achieved in that the core is compressed in order to pre-form depressions in which the relief of the sheet opposite can be accommodated and in that said sheet bearing a relief is then glued at least to those parts of the core not provided with depressions.

As, with the method according to the invention, the depressions are made in the correct position beforehand, the sheets can be placed with the associated relief in the correct position on the pre-formed core without any difficulty. The depressions in the core and the corresponding protuberances on the sheets ensure that the correct mutual positioning is guaranteed, even at the peripheral edges.

An additional advantage of making the depressions in the core beforehand lies in the strengthening effect of the parts of the core which are highly compressed in these locations. Said compressed parts give the core, which initially is fairly flexible, a certain rigidity in its plane, which facilitates treatment, for example during the application of glue.

The method can, in particular, be carried out using a core composed of material containing moisture-absorbent fibres. In that case the method comprises the successive steps of compression and then drying of the core.

With this method the core can, after compression, also be fed through the nip between two rollers in such a way that the strip edges are moistened, crushed immediately thereafter and then dried. The advantage of such crushed strip edges is that these provide excellent adhesion between sheet and core as a result of the enlargement of their surface area.

Drying of the strip edges can also be carried out before the core is compressed.

The invention also relates to an installation for carrying out the method according to the invention. An installation of this type comprises a frame provided with a guide track for guiding the core, a compression mould located on one side of the guide track and also a compression mould which is located opposite the first mould and on the other side of the guide track, at least one of the compression moulds being movable backwards and forwards in the direction of the other.

The compression moulds are so constructed that the material of the core is strongly compressed at the site of the depressions. In this way the core acquires not only the desired depressions but also the correct rigidity in its plane, which is important for further processing.

Preferably, the guide track is horizontal and the upper compression mould is stationary, whilst the lower compression mould is movable in the vertical direction.

In connection with the production of panels provided with different profiles, each compression mould preferably comprises a pressure plate to which an interchangeable moulding plate can be fitted.

The invention will be explained in more detail below with the aid of an illustrative embodiment shown in the figures.

DESCRIPTION OF THE PREFERRED EMBODIMENT

Figure 1:
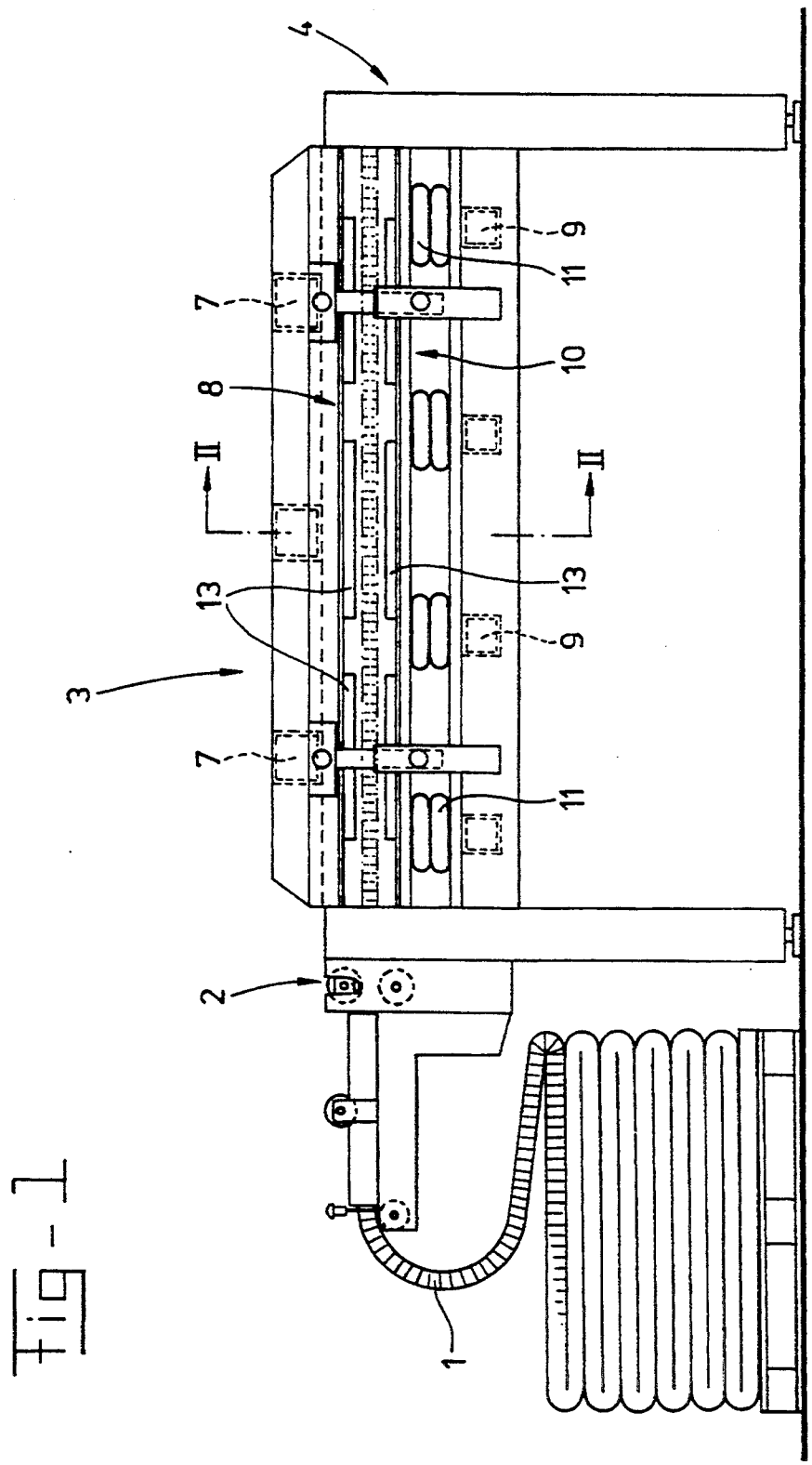
FIG. 1 shows a side view of the installation for forming a recessed relief in a honeycomb core.
Figure 2:
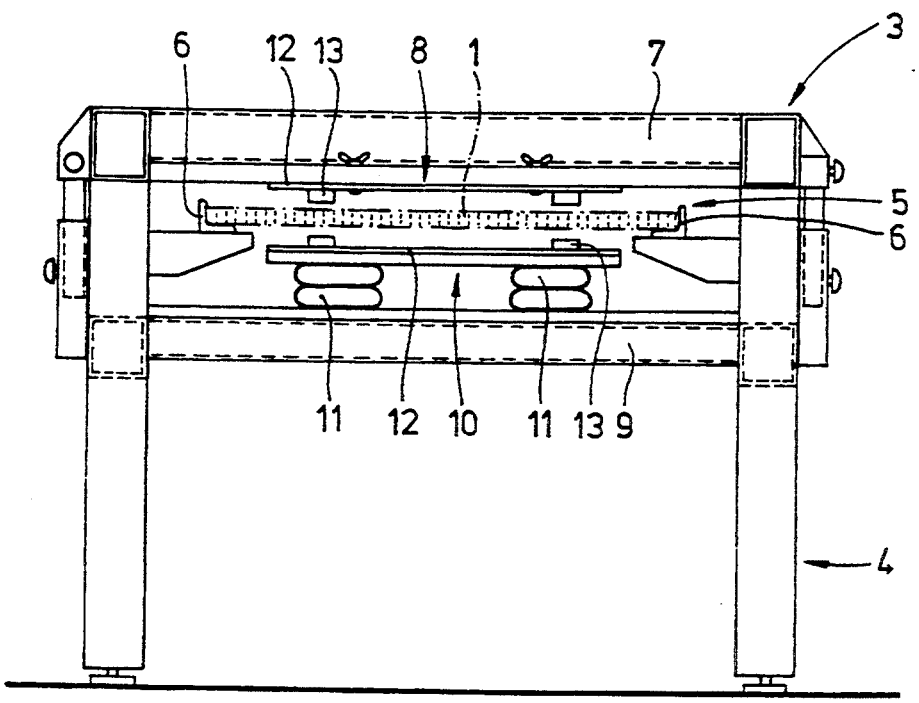
FIG. 2 shows the cross-section along line II—II in FIG. 1.

In the installation shown in FIG. 1, a honeycomb core 1 composed of strips of flexible material, for example cardboard, is fed in a known manner by means of the feed mechanism 2 to the press installation, which is designated in its entirety by 3. Said press installation comprises a frame 4, which has a guide track 5, shown in FIG. 2, for the honeycomb core. Said guide track 5 comprises two adjustable rails 6, which can be adjusted to the width of the honeycomb core 1.

The frame 4 comprises a number of upper supporting beams 7, to which an upper compression mould 8 is fixed. The frame also comprises a number of lower supporting beams 9, on which a lower compression mould 10 is mounted. Said compression mould 10 is supported with respect to the supporting beams 9 by means of a number of bellows 11, which bellows 11 are able to push the lower compression mould 10 in the direction of the upper compression mould 8 when they are supplied with compressed air.

Said compression moulds each comprise an interchangeable moulding plate 12, which is provided with the desired protuberances 13 which form the relief.

Said press installation operates as follows. As soon as the desired piece of honeycomb core material is between the compression moulds 8, 10, the lower compression mould 10 is pushed upwards by the bellows 11. During this operation the honeycomb core 1 is lifted slightly from the guide tracks 6 and pressed against the protuberances 13 on the upper compression mould 8.

Figure 3:
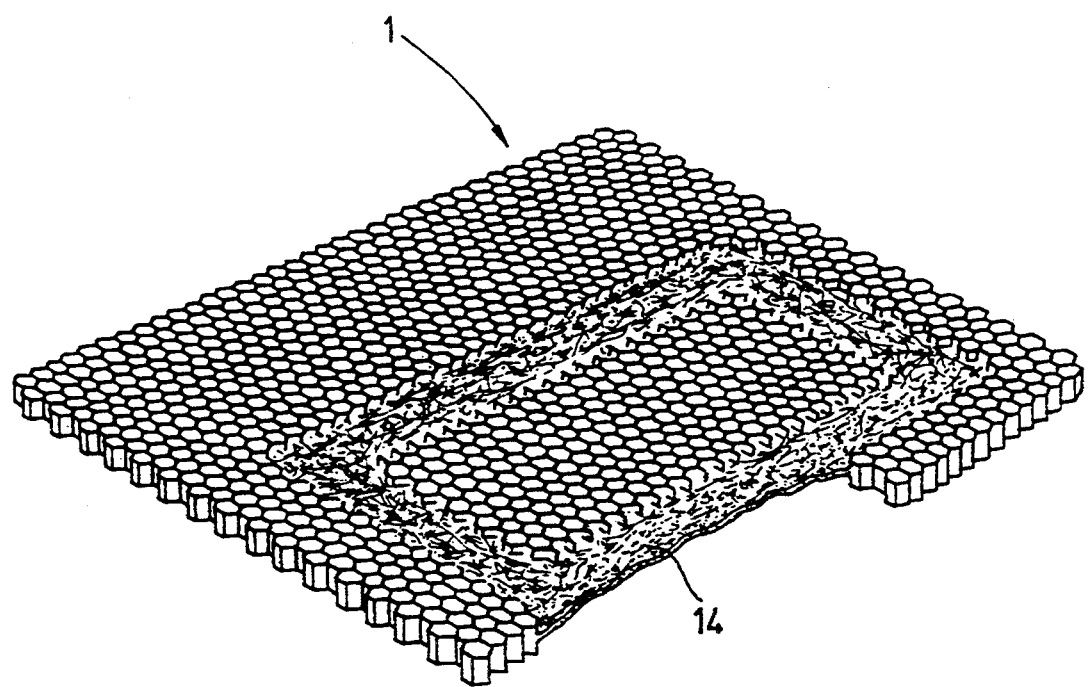
FIG. 3 shows part of a honeycomb core, with a relief made therein.

Those parts of the honeycomb core which are between the protuberances 13 are pressed flat during this operation, as can be seen in the perspective view in FIG. 3. In this figure the area of the honeycomb core which has been pressed completely flat is indicated by 14. An area of this type which has been pressed flat has a greater rigidity in its plane than has the surrounding honeycomb area and therefore has a stabilising influence on the part of the honeycomb core which is close to the flattened area 14. By this means handling of the honeycomb core after the pressing treatment is simplified: the relative dimensional stability of the core 1 having flattened areas 14 makes it possible to move said core in a simple manner to the subsequent treatment.

Figure 4:
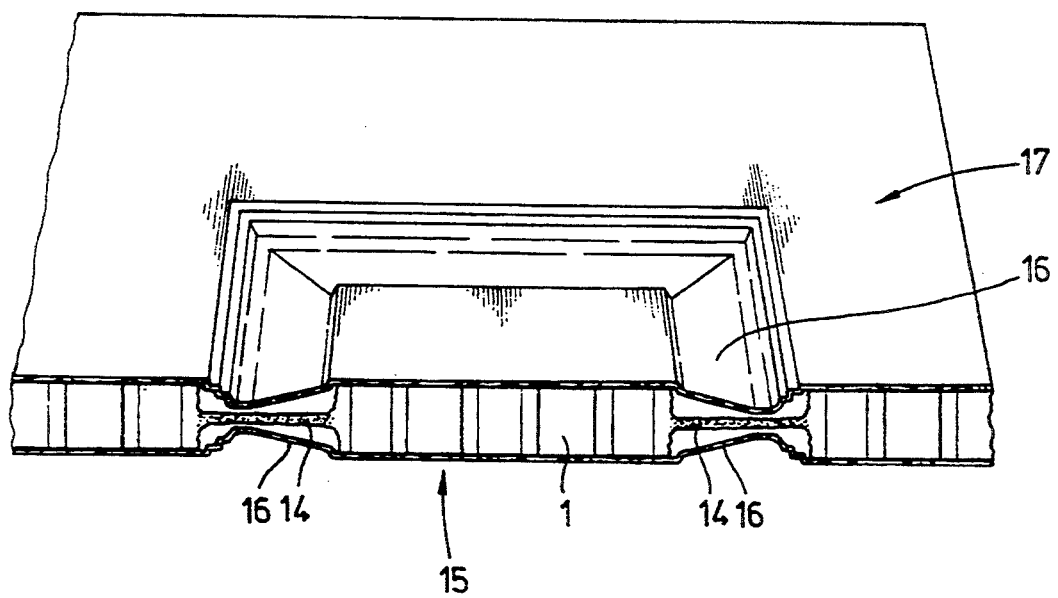
FIG. 4 shows a partial cross-sectional view of a finished panel which has a honeycomb core according to FIG. 3.

Said subsequent treatment comprises applying cover sheets 15, 17 either side of the honeycomb core 1, as shown in FIG. 4. Said cover sheets 15, 17 each comprise an area 16 of relief. During this operation, the flattened sections 14 of the honeycomb core are applied in a position such that said recessed parts 16 of the cover sheets 15, 17 are located at precisely the position of said flattened areas.

This means that the cover sheets 15, 17 are glued to the honeycomb core 1 only by those sections thereof which are not provided with a relief. This is not a drawback since the flattened sections 14 form only a small part of the total surface area of the honeycomb core.

What is claimed:

1. A method for producing a panel, for example a door panel, which comprises:

two sheets, at least one of which is provided with a relief, between which sheets a core of strips running transversely to said sheets is located; and said method comprising the gluing of each said sheet to the strip edges opposite, characterized in that said core is compressed in order to pre-form depressions in which said relief of said sheet opposite is accommodated without conforming to said depressions and in that said sheet is then glued to those parts of said core not provided with said depressions.

2. Method according to claim 1, wherein the core is, after compression, fed through the nip between two rollers, the strip edges being moistened, crushed immediately thereafter and then dried.

3. Method according to claim 1, wherein the core is composed of material containing moisture-absorbent fibres, said method comprising the compression and then drying of the core.

4. Method according to claim 3, wherein the core is, after compression, fed through the nip between two rollers, the strip edges being moistened, crushed immediately thereafter and then dried.

* * * * *